United States Patent
Sarkar et al.

(10) Patent No.: US 11,025,575 B2
(45) Date of Patent: Jun. 1, 2021

(54) MESSAGE RECOGNITION SYSTEM AND METHOD CONFIGURABLE TO DEFINE NEW MESSAGE FORMATS

(71) Applicant: ORACLE FINANCIAL SERVICES SOFTWARE LIMITED, Mumbai (IN)

(72) Inventors: Subrata Sarkar, Bangalore (IN); Amit Kumar Sahoo, Cuttack (IN); Arup Saha, Bangalore (IN); Kushagra Jindal, Jaipur (IN); Santanu Kumar Chakrabarty, Balasore (IN); Ruchi Tripathi, Bangalore (IN); K. R. Srikant, Bhubaneswar (IN)

(73) Assignee: Oracle Financial Services Software Limited, Mumbai (IN)

(*) Notice: Subject to any disclaimer, the term of this patent is extended or adjusted under 35 U.S.C. 154(b) by 320 days.

(21) Appl. No.: 16/006,054

(22) Filed: Jun. 12, 2018

(65) Prior Publication Data

US 2019/0379623 A1    Dec. 12, 2019

(51) Int. Cl.
*H04L 12/58* (2006.01)
*G06F 16/245* (2019.01)
*G06F 8/38* (2018.01)

(52) U.S. Cl.
CPC .......... *H04L 51/18* (2013.01); *G06F 16/245* (2019.01); *G06F 8/38* (2013.01)

(58) Field of Classification Search
CPC ................................ G06F 8/38; H04L 51/18
(Continued)

(56) References Cited

U.S. PATENT DOCUMENTS 6,061,665 A * 5/2000 Bahreman .............. G06Q 20/00
    705/40
6,772,216 B1 * 8/2004 Ankireddipally ....... H04L 29/06
    709/203
(Continued)

FOREIGN PATENT DOCUMENTS

| CN | 101882293 A | 11/2010 |
|---|---|---|
| WO | 1998056024 A1 | 12/1998 |
| WO | 2015049515 A1 | 4/2015 |

OTHER PUBLICATIONS sourceforge.net, SWIFT Message Parser, 1 pg., downloaded on Sep. 12, 2017 from: https://sourceforge.net/projects/swifty/.
(Continued)

*Primary Examiner* — Nicholas P Celani
(74) *Attorney, Agent, or Firm* — Kraguljac Law Group, LLC

(57) ABSTRACT

Systems, methods, and other embodiments associated with a message recognition system configurable to define new message formats and interpret electronic transaction messages are described. In one embodiment, a method includes analyzing an electronic transaction message received from a remote device to determine a message type of the electronic transaction message. A message type data structure is queried to determine whether the message type is defined in the message type data structure. A message type configuration interface comprising one or more input fields for defining the message type is generated. Parameters are received via the one or more input fields of the message type configuration interface, and a message type definition is generated based upon the one or more parameters. The message type data structure is reconfigured to include the message type definition.

20 Claims, 8 Drawing Sheets

(58) Field of Classification Search
USPC .......................................... 709/204; 705/44
See application file for complete search history.

(56) References Cited

U.S. PATENT DOCUMENTS

| | | | |
|---|---|---|---|
| 7,391,735 B2 | 6/2008 | Johnson | |
| 7,831,246 B1* | 11/2010 | Smith | G06Q 20/40 |
| | | | 455/408 |
| 8,010,428 B2 | 8/2011 | Maw et al. | |
| 9,275,397 B2 | 3/2016 | Maw | |
| 9,489,418 B2* | 11/2016 | Brodsky | G06F 16/2423 |
| 9,807,187 B2* | 10/2017 | Herman | G06F 40/205 |
| 10,269,018 B2* | 4/2019 | Kumnick | G06Q 20/3674 |
| 10,326,862 B2* | 6/2019 | Bonig | H04L 67/42 |
| 2002/0032655 A1* | 3/2002 | Antonin | G07F 19/201 |
| | | | 705/43 |
| 2006/0288270 A1* | 12/2006 | Gaurav | G06F 40/174 |
| | | | 715/210 |
| 2007/0206633 A1* | 9/2007 | Melamed | H04L 43/0852 |
| | | | 370/469 |
| 2010/0223325 A1* | 9/2010 | Wendker | G06F 16/252 |
| | | | 709/203 |
| 2011/0173680 A1* | 7/2011 | Bates | G06Q 10/10 |
| | | | 726/4 |
| 2012/0203689 A1* | 8/2012 | Parvis | G06Q 40/00 |
| | | | 705/39 |
| 2013/0218945 A1* | 8/2013 | Hanumolu | G06Q 10/067 |
| | | | 709/203 |
| 2013/0346273 A1 | 12/2013 | Stockton et al. | |
| 2014/0019339 A1* | 1/2014 | Shields | G06Q 20/26 |
| | | | 705/39 |
| 2015/0120472 A1* | 4/2015 | Aabye | G06Q 20/40 |
| | | | 705/16 |
| 2015/0348038 A1* | 12/2015 | Femrite | G06Q 20/4014 |
| | | | 705/44 |
| 2015/0363374 A1* | 12/2015 | Lees | G06F 8/73 |
| | | | 715/256 |
| 2016/0094491 A1* | 3/2016 | Fedorov | H04L 12/56 |
| | | | 709/206 |
| 2016/0125369 A1* | 5/2016 | Grassadonia | G06Q 20/3224 |
| | | | 705/44 |
| 2016/0132883 A1* | 5/2016 | Evans | G06Q 20/4014 |
| | | | 705/44 |
| 2017/0264522 A1* | 9/2017 | Long | G06F 16/955 |
| 2018/0121908 A1* | 5/2018 | Lin | G06Q 20/4012 |

OTHER PUBLICATIONS

Idola, SWIFT Message Director Product Description; SWIFT Message Director 2.0, 1 pg., downloaded on Sep. 11, 2017 from: http://www.idolainfotech.com/productssmd.php.

Kimaran Systems, SWIFT Implementation, pp. 1-3, downloaded on Sep. 11, 2017 from: http://kumaran.com/banking/swift-implementation/.

* cited by examiner

MESSAGE RECOGNITION SYSTEM AND METHOD CONFIGURABLE TO DEFINE NEW MESSAGE FORMATS

BACKGROUND

Computing devices are used to implement various services and products for facilitating electronic transactions. For example, various computing devices may provide an electronic transaction service configured to perform transactions that are initiated or controlled by transmitting electronic messages to, and receiving electronic messages from, other computing devices. The electronic messages may be transmitted between computing devices that are dispersed throughout different geographical locations, and belong to the same or different corporate institutions. Transmitted and received electronic transaction messages may be stored within databases or other storage structures of a distributed network environment (e.g., a cloud service), or within databases or other storage structures of a local computer. Users may interact with each of the computing devices to generate the electronic transaction messages, transmit the electronic transaction messages, and/or perform operations using the electronic transaction messages.

Various computing devices may transmit electronic transaction messages using various formats. Over time, some computing devices may adopt new formats for their electronic transaction messages. Thus, some computing devices may not be familiar with the format of electronic transaction messages that they receive.

In order to improve the performance of the computing devices, the effectiveness of the services, the rate of successful processing of electronic transaction messages, and satisfaction of customers of a corporation's transaction services, it is desirable for the providers of the services to be able to efficiently interpret electronic transaction messages that have new formats.

Unfortunately, typical existing techniques are limited to using professional coders to identify a new format, and generate new code to properly process electronic transaction messages with the new format. Thus, the processing of electronic transaction messages has been restricted by having a limited, and often slowly updated, understanding of formats.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

Figure 1:
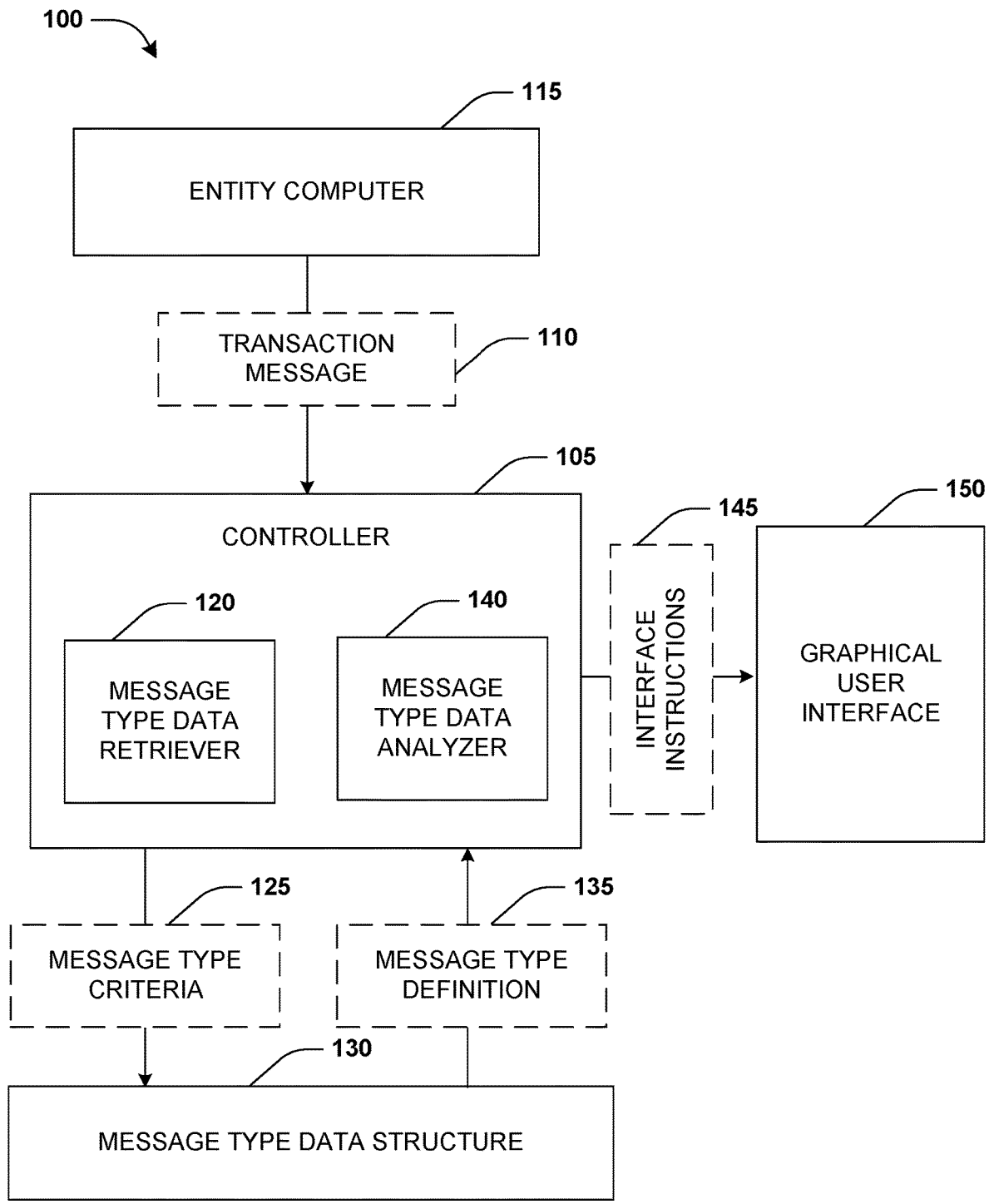
FIG. 1 illustrates an embodiment of a system associated with reconfiguring a message type data structure to include a message type definition of a message type of an electronic transaction message.

Computerized systems and methods are described herein that provide for a message recognition system configurable to define new message formats and interpret electronic transaction messages using defined message formats. In one embodiment, the message recognition system analyzes a received electronic transaction message to determine a message type. If the message type is not defined or is otherwise unrecognized, a message type configuration interface is employed to generate a definition for the message type so that the electronic message can be recognized and processed correctly. Additionally, subsequently received messages having the same message type can be recognized and processed correctly since the message definition exists.

The message recognition system improves existing technological processes for interpreting electronic transaction messages and defining new message formats by implementing the message type configuration interface as a centralized tool for defining parameters of new message formats from unrecognized messages. Thus, the message recognition system eliminates trial-and-error attempts to process unrecognized electronic messages without sufficient information and reduces system errors that may occur when an unrecognized message format is received.

The message recognition system also eliminates or reduces an amount of dedicate expensive resources that are used, such as professional programmers/coders, to manually write code defining new message formats. By doing so, the system solves technical problems relating to errors, time delays and wasted resources caused by the receipt of electronic transaction messages with message types that are not defined. The message type configuration interface is centralized by virtue of providing a single interface for handling unrecognized message formats and defining new formats from remote computers throughout a network. Thus the centralized interface reduces or eliminates the need for a team of professional coders to separately provide manual inputs across multiple interfaces to define a message format.

In one example, a first remote device may run a first electronic transaction application, and a second remote device may run (a different instance of) the first electronic transaction application and/or a second electronic transaction application. The operation of each remote device may include generating and/or processing electronic transaction messages in accordance with message type definitions. In some examples, the electronic transaction messages may be Society for Worldwide Interbank Financial Telecommunication (SWIFT) messages sent via the SWIFT network.

Each message type definition may, for example, correspond to a format of an electronic transaction message. For example, each message type definition may specify what respective portions of an electronic transaction message represent for each message type. One portion may represent an institute code, while a different portion may represent a country code, a city code, a branch code, etc. Each message type definition thus enables a recipient of electronic transaction messages to accurately interpret electronic transaction messages associated with the message type definition.

Often, entities (e.g., corporations, banks) operating a network of such remote devices may create a new message type definition. The entities may use the new message type definition to generate and transmit electronic transaction messages to other remote devices in their own network. However, remote devices outside their network, such as devices controlled/operated by other entities (e.g., other corporations) may receive these electronic transaction messages and will not be able to recognize the new message type definition.

The remote devices outside of the network lack familiarity with the new message type definition, and thus are unable to process the electronic transaction messages. The receiving remote devices may thus need to have a team of professional coders to implement new code to recognize and process the electronic transaction messages. The team of professional coders may need to be trained to analyze the electronic transaction messages, develop an understanding of the new message type definition based on the electronic transaction messages, regularly test the remote devices, and reprogram the remote devices to be able to process the electronic transaction messages and/or future messages associated with the new message type definition.

Unfortunately, the entities involved, as well as the users attempting to perform transactions, may face significant delay and hurdles to having electronic transaction messages properly processed. For example, the entities may be required to wait for the reprogramming of the remote devices by the professional coders. Prior to the reprogramming, the electronic transaction messages may fail to be processed.

Such delays and failures can lead to a fall in satisfaction with the entities and their remote devices. Ultimately, such a fall in satisfaction can lead users to decrease their use of the entities and their remote devices. Additionally, the reprogramming of the remote devices by professional coders involves a substantial consumption of technical resources, including computer resources, network resources and power resources. Such reprogramming can also consume significant non-technical resources, such as financial resources and human resources.

Thus, in order to optimize the performance of the remote devices in facilitating electronic transactions, the present system provides a graphical user interface to facilitate the reprogramming of the remote devices to incorporate new message type definitions. By doing so, electronic transaction messages may be processed using a reduced number of resources and a reduced delay that results in processing of electronic transaction messages at an increased speed. Thus, electronic transactions associated with the electronic transaction messages may be facilitated with fewer resources and less delay. Accordingly, the disclosed system may improve efficiency, resource (e.g., memory, bandwidth, processor, etc.) availability, and reduce power usage.

With reference to FIG. 1, one embodiment of a computerized system 100 associated with a message recognition system configurable to define new message formats and interpret electronic transaction messages is illustrated. The system 100 includes a controller 105, which may be configured to execute on a computer. The controller 105 may be initiated based upon an electronic transaction message 110 being received from an entity computer 115.

In one example, the entity computer 115 is a computer of a manager of an entity that is requesting that an electronic transaction be performed. The electronic transaction message 110 may provide for the transfer of assets from a first account to a second account. Such accounts may include personal accounts, joint accounts, corporate accounts, etc. The controller 105 may belong to a second entity involved in the electronic transaction, and may receive the electronic transaction message 110 over a network connection.

The controller 105 utilizes a message type data retriever 120 to generate message type criteria 125 (of the electronic transaction message 110). The message type criteria 125 identifies data representative of one or more elements (components/portions) of the electronic transaction message 110. The message type criteria 125 may specify one or more aspects of the electronic transaction message 110. Such aspects may include identifiers extracted from the electronic transaction message 110, one or more values in the electronic transaction message 110, an arrangement of the values in the electronic transaction message 110, a number of values in the electronic transaction message 110, a pattern identified in the electronic transaction message 110, etc.

The message type criteria 125 are used to analyze a message type data structure 130 in order to identify data records that match to be considered for the electronic transaction message 110. The message type data structure 130 includes data records of one or more definitions of one or more message types. For example, data records indicative of definitions of various message types may be aggregated and stored in the message type data structure 130. Each definition may include identifiers, values, arrangements, and/or patterns associated with the corresponding message type. For example, each definition may comprise information that may be used to analyze an exemplary electronic transaction message and determine whether the exemplary electronic transaction message conforms to the message type of the definition.

When the controller 105 determines that the message type of the electronic transaction message 110 is defined by a message type definition 135 in the message type data structure 130, the controller 105 extracts the message type definition 135 and uses it to process/interpret the electronic transaction message 110. In some examples, the message type definition 135 may include definitions of message types that meet a threshold number of criterion of the message type criteria 125. For example, one or more first definitions (in the message type data structure 130) that meet the threshold number of criterion of the message type criteria 125 may be included in the message type definition 135, while one or more second definitions in the message type data structure 130 that do not meet the threshold number of criterion of the message type criteria 125 may not be included in the message type definition 135.

The message type definition 135 may be used to process the electronic transaction message 110. As part of the processing, the electronic transaction message 110 may be parsed into message components based upon the message type definition 135. The message type definition 135 identifies, for example, the structure of the components (e.g., identity of components and location, order of components). The message type definition 135 is used to control how the message components are parsed to identify the components. The message components may be analyzed to determine an electronic action based upon a first component of the message components. An electronic message may be generated based upon a second component of the message components. The electronic message may comprise an instruction to perform the electronic action. The electronic message may be transmitted to a third remote device and/or a (consuming) application.

When the controller 105 determines that the message type of the electronic transaction message 110 is not defined in the message type data structure 130, the controller 105 generates interface instructions 145 corresponding to a message type configuration interface for defining the message type. The interface instructions 145 may be provided to a computer device, and may thus control a graphical user interface 150 of the computer device to display the message type configuration interface.

The message type configuration interface includes one or more input fields that are usable to define one or more parameters of the message type. In some examples, the input fields included in the message type configuration interface may correspond to the electronic transaction message 110. For example, each input field may be generated based upon identifiers, values, arrangements, and/or patterns determined in association with the electronic transaction message 110.

In some examples, the message type configuration interface is linked to one or more related message type configuration interfaces via one or more elements. For example, in response to a selection of a first element in the message type configuration interface, a second message type configuration interface presenting one or more (additional) input fields may be displayed. In response to a selection of a second element in the second message type configuration interface, a third message type configuration interface presenting one or more (additional) input field may be displayed.

Each input field of the message type configuration interface (and the additional message type configuration interfaces, where applicable) is configured to receive a selection of an option associated with a first parameter or an entry of a value associated with a second parameter. The parameters received via the input fields of the message type configuration interface are used to generate a (new) message type definition that corresponds to a message format of the electronic transaction message 110. For example, the message type definition that is generated may be configured to process the electronic transaction message 110 and other messages that share the message type of the electronic transaction message 110.

The message type data structure 130 is reconfigured to include the message type definition. For example, data records describing the message type definition, and associating the message type definition with the message type of the electronic transaction message 110, are stored in the message type data structure 130.

In some examples, such as examples where the message type definition is not determined to be a newer version of an existing message type definition in the message type data structure 130, or where the message type definition is not determined to have at least a threshold level of similarity with the existing message type definition, the message type definition may be stored as a new definition. In other example, such as examples where the message type definition is determined to be a newer version of an existing message type definition in the message type data structure 130, or where the message type definition is determined to have at least a threshold level of similarity with the existing message type definition, an existing message type definition may be modified into the message type definition.

Electronic transaction messages received by the controller 105 after the reconfiguration of the message type data structure 130 may thus be compared to the message type definition. If the message type of the electronic transaction messages corresponds to the message type of the message type definition, the electronic transaction messages may be processed using the message type definition.

Thus, the controller 105 (e.g., and the second entity operating the controller 105) is able to mitigate a delay in processing electronic transaction messages of the message type. The controller 105 also mitigates the resources needed to create a definition by decreasing or eliminating the need for professional coders to analyze the electronic transaction message 110 and generate a definition.

The controller 105 further mitigates or eliminates a dependence on a third party provider to provide updated definitions to the controller 105 via a network connection, and increases the speed at which electronic transaction messages are processed by creating/improving a graphical user interface usable to define the message type and thus efficiently create parsing logic. The parsing logic is configured to be used by the controller 105 to process other electronic transaction messages that share the message type of the electronic transaction message 110.

In one example, a second electronic transaction message may be received by the controller 105. The second electronic transaction message may be determined to be of the message type. Using the parsing logic, parts of the second electronic transaction message may be read, parsed, identified, extracted and used to perform a second electronic transaction. Alternatively and/or additionally, using the parsing logic, a parse tree may be constructed based upon the second electronic transaction message. The parse tree may then be used to perform the second electronic transaction.

Figure 2:
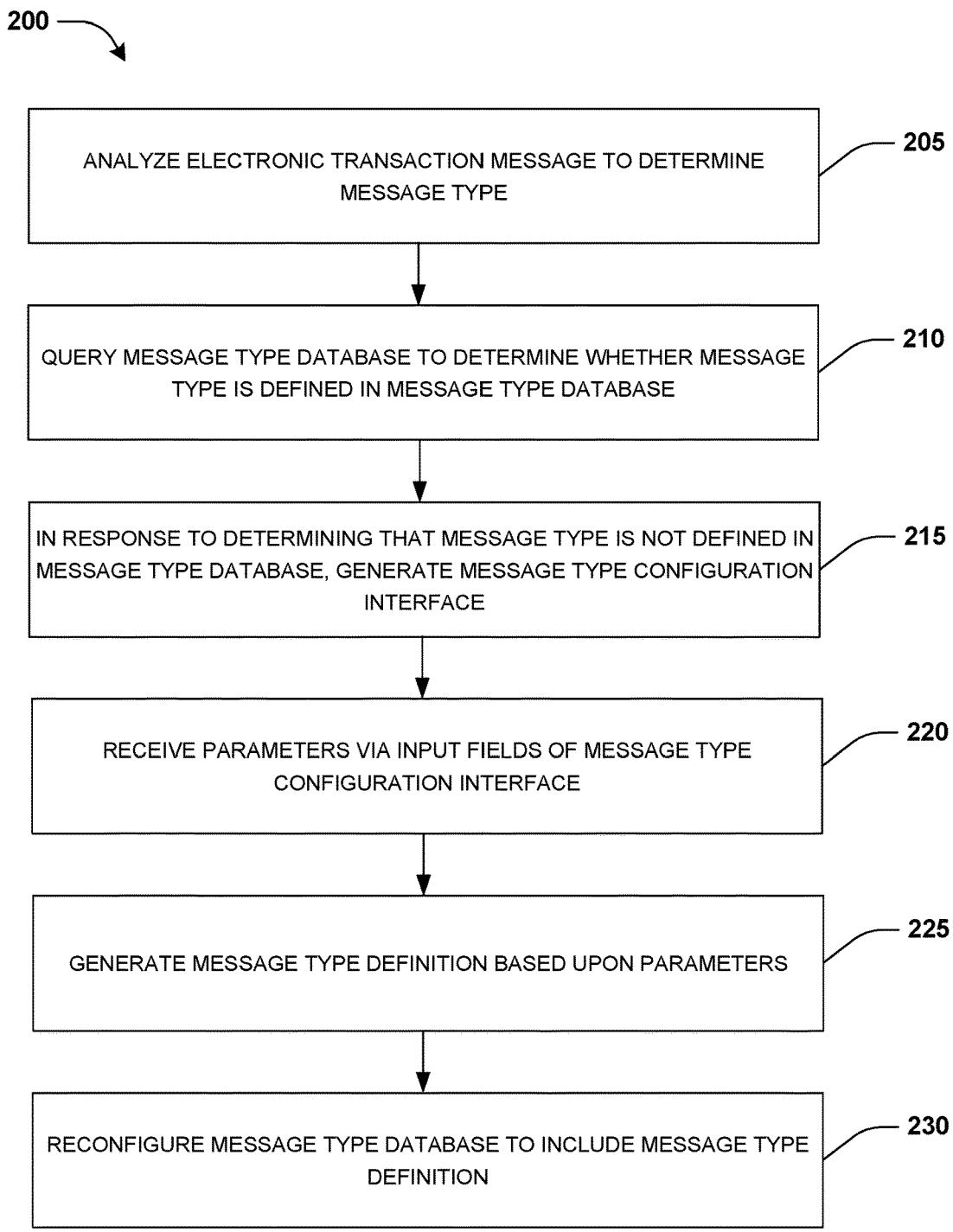
FIG. 2 illustrates an embodiment of a method associated with reconfiguring a message type data structure to include a message type definition of a message type of an electronic transaction message.

FIG. 2 illustrates one embodiment of a computer-implemented method 200 associated with a message recognition system configurable to define new message formats and interpret electronic transaction messages. In one embodiment, method 200 is performed by the controller 105 of FIG. 1 utilizing various computing resources of the computer 805 (shown in FIG. 8), such as the processor 810 for executing instructions, memory 815 and/or disks 830 for storing data structures within which control instructions are generated, and/or network hardware for transmitting data structures to remote computers over networks. The method 200 may be triggered based upon various triggers, such as receipt of the electronic transaction message 110 from the entity computer 115, etc. In some examples, the electronic transaction message 110 is received by a server (hosting the controller 105), from the entity computer 115.

Figure 4:
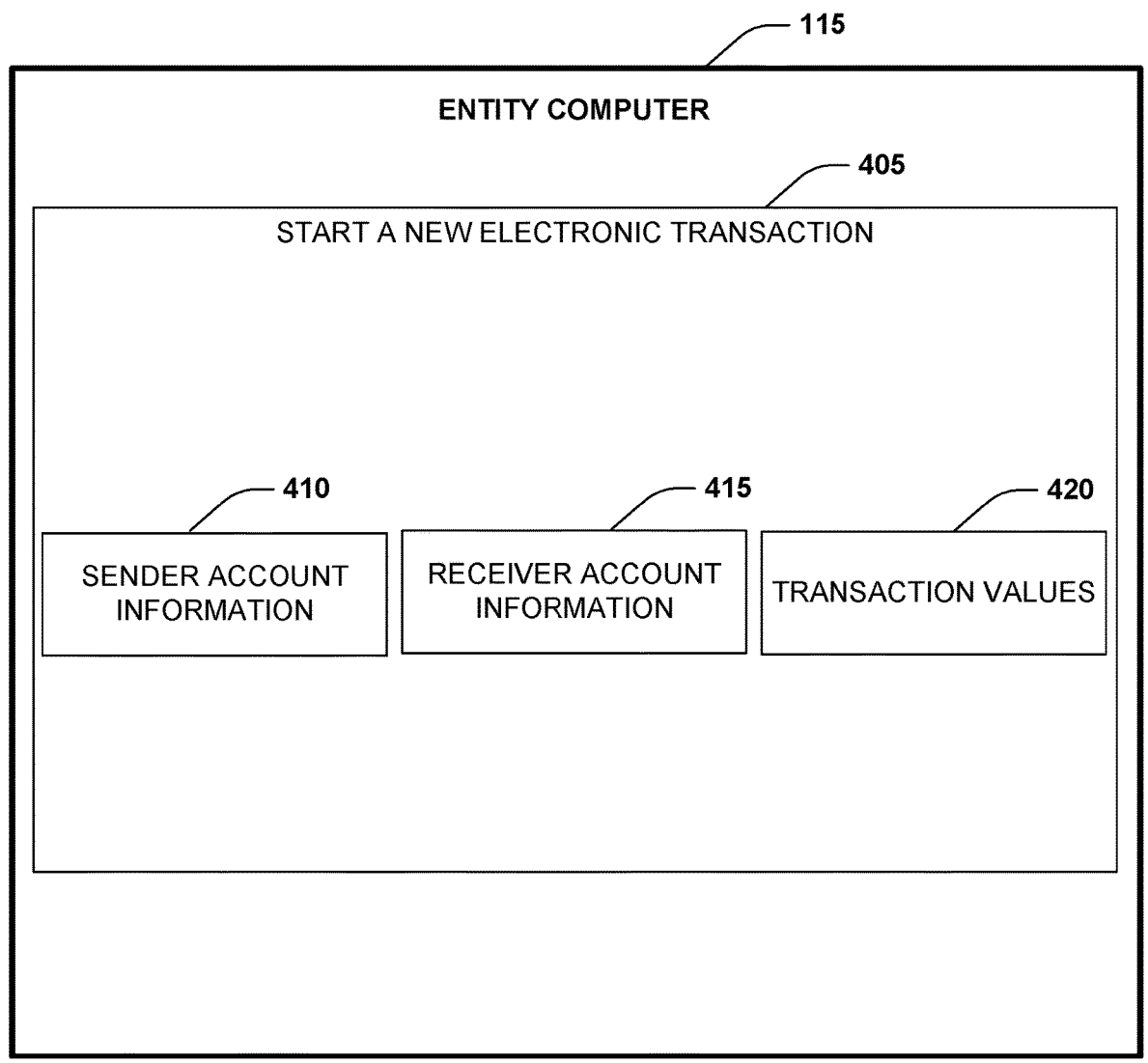
FIG. 4 illustrates an embodiment of an entity computer and a graphical user interface.

The electronic transaction message 110 may be generated by the entity computer 115 (prior to the triggering of the method 200), as part of an attempt to perform an electronic transaction. In one embodiment, a graphical user interface 405 on the entity computer 115 may be used to generate the electronic transaction message 110, as illustrated in FIG. 4. The graphical user interface 405 is controlled to display a first graphical object 410 associated with sender account information, a second graphical object 415 associated with receiver account information, and a third graphical object 420 associated with transaction values.

The first graphical object 410 is configured to receive user input indicative of sender account information, such as a sender name (e.g., First Company Inc.) or a sender account number (e.g., 000123). The second graphical object 415 is configured to receive user input indicative of receiver account information, such as a recipient name (e.g., Second Company LLC) or a recipient account number (e.g., 000789). The third graphical object 420 is configured to receive user input indicative of transaction values (e.g., identify asset or currency amount to be exchanged, transferred, or moved).

The user input received via the graphical user interface 405 is used to generate the electronic transaction message 110. It may be appreciated that the electronic transaction message 110 may provide instructions for a transfer of the transaction value (e.g., asset amount) from the sender account to the recipient account, for example.

The entity computer 115 then transmits the generated electronic transaction message 110 to the controller 105. The electronic transaction message 110 may be transmitted over a network connection between the entity computer 115 and the controller 105, such as the Internet. Receipt of the electronic transaction message 110 by the controller 105 triggers method 200, illustrated in FIG. 2.

At 205, in response to receiving the electronic transaction message 110 from the entity computer 115, the electronic transaction message 110 is analyzed to determine a message type of the electronic transaction message 110. For example, the electronic transaction message 110 may be parsed and a plurality of elements may be identified in the electronic transaction message 110.

Figure 3:
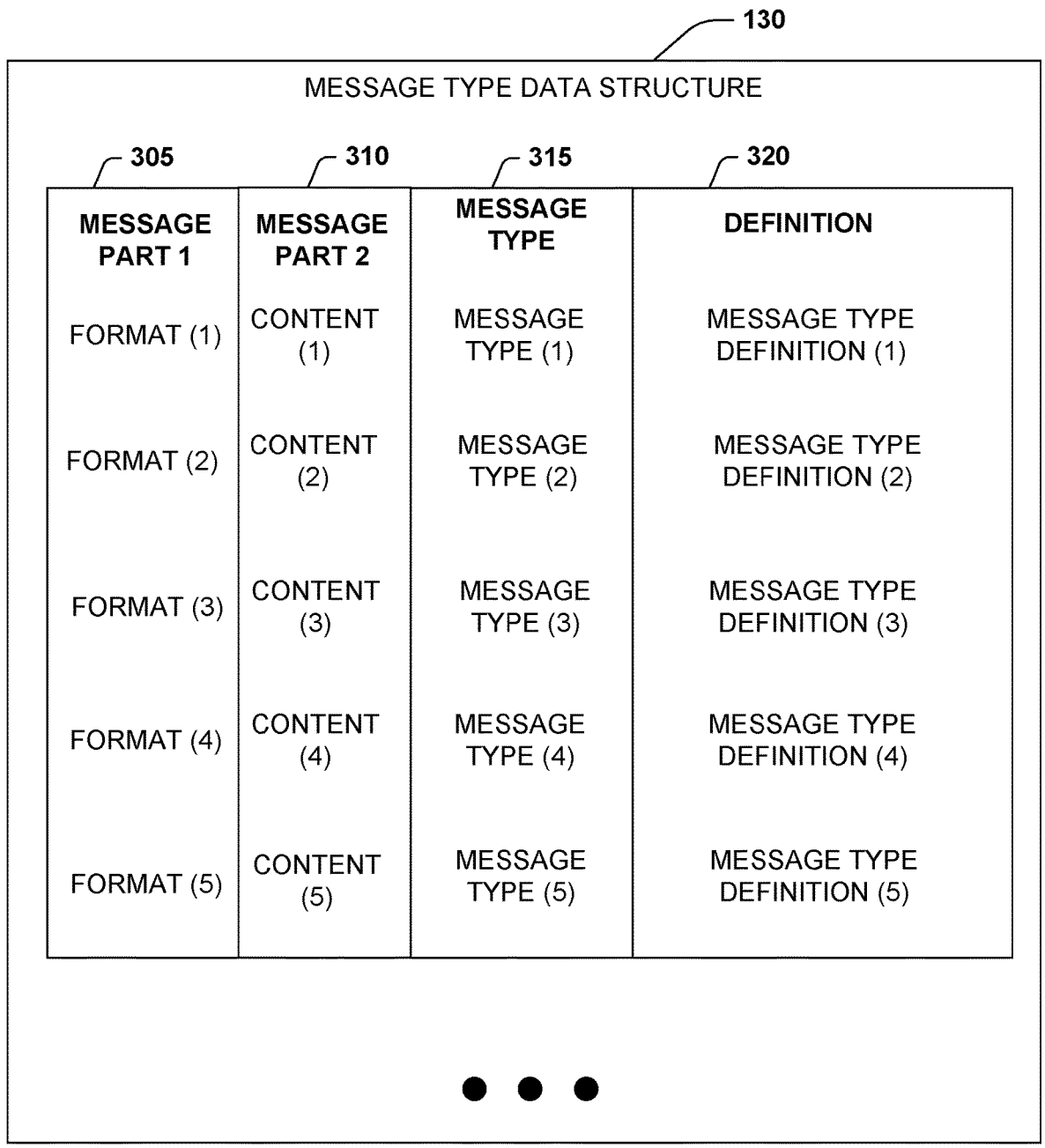
FIG. 3 illustrates an embodiment of a message type data structure.

At 210, the message type data structure 130 is queried to determine whether the message type is defined in the message type data structure 130. For example, the plurality of elements identified in the electronic transaction message 110 may be compared to definitions and/or parts in the message type data structure 130. One embodiment of the message type data structure 130 is illustrated in FIG. 3 and includes data records of a plurality of message types 315, and first message parts 305, second message parts 310 and message type definitions 320 associated with each of the message types 315. The first message parts 305 are indicative of formatting parameters associated with each message type, while the second message parts 310 are indicative of the content associated with each message type, for example.

In response to determining that at least one element (or a threshold number of elements) of the plurality of elements is not defined in, or associated with, the definitions in the message type data structure 130, a determination is made that the message type of the electronic transaction message 110 is not defined in the message type data structure 130. Based upon the lack of a definition for the message type, the system determines that the electronic transaction message 110 is not recognized (unknown message type) and cannot be interpreted without first generating a message type definition for the message type.

If, instead, all (or a threshold number) elements of the plurality of elements are defined in the message type data structure 130, a determination would be made that the message type of the electronic transaction message 110 is defined in the message type data structure 130. Based upon the availability of a definition for the message type, the system may interpret the electronic transaction message 110 using the available definition, and may perform the electronic transaction as requested within the received transaction message.

At 215, in response to determining that the message type of the electronic transaction message 110 is not defined in the message type data structure 130, a message type configuration interface is generated. The message type configuration interface is configured to include selectable inputs usable to define parameters of a new definition for the message type. Thus, the message type configuration interface provides a fast and simple way to generate the new definition without requiring the manual coding and reprogramming of the controller 105 by a team of professional coders.

Figure 5:
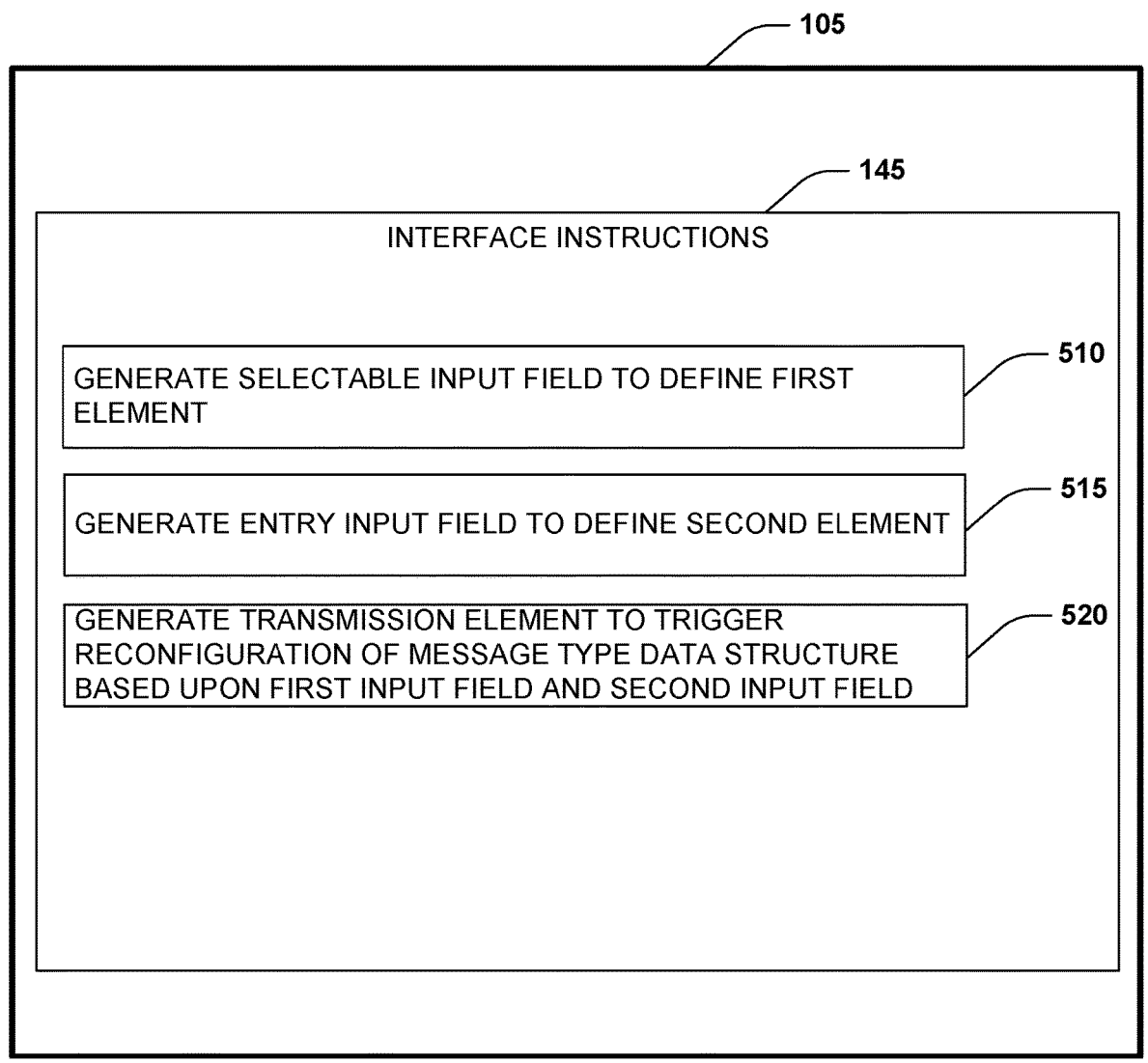
FIG. 5 illustrates an embodiment of a controller with interface instructions.

The generation of the message type configuration interface may include generating the interface instructions 145. FIG. 5 illustrates one embodiment of the interface instructions 145. The interface instructions 145 include instructions to generate one or more input fields corresponding to elements of the electronic transaction message 110 that were determined to not be defined in the message type data structure 130. In one embodiment, a first instruction 510 provides for generating a selectable input field to define a first element of the electronic transaction message 110, and a second instruction 515 provides for generating an entry input field to define a second element of the electronic transaction message 110. The selectable input field and the entry input field may be displayed in the message type configuration interface.

The interface instructions 145 also include instructions to generate one or more activation elements. For example, a third instruction 520 provides for generating a transmission element for display in the message type configuration interface. Selection of the transmission element (by a user of the message type configuration interface, for example) triggers a reconfiguration of the message type data structure 130 based upon data received from the selectable input field and data received from the entry input field.

A computer device may be selected as the destination for the interface instructions 145 based upon a determination that the computer device is configured to generate parsing logic for new message types and reconfigure the message type data structure 130. In some embodiments, the computer device is the same as the controller 105, while in other embodiments, the computer device is different than the controller 105. The interface instructions 145 are transmitted from the controller 105 to the computer device (if the computer device is different than the controller 105). The computer device controls the graphical user interface 150 on a display screen 600.

Figure 6:
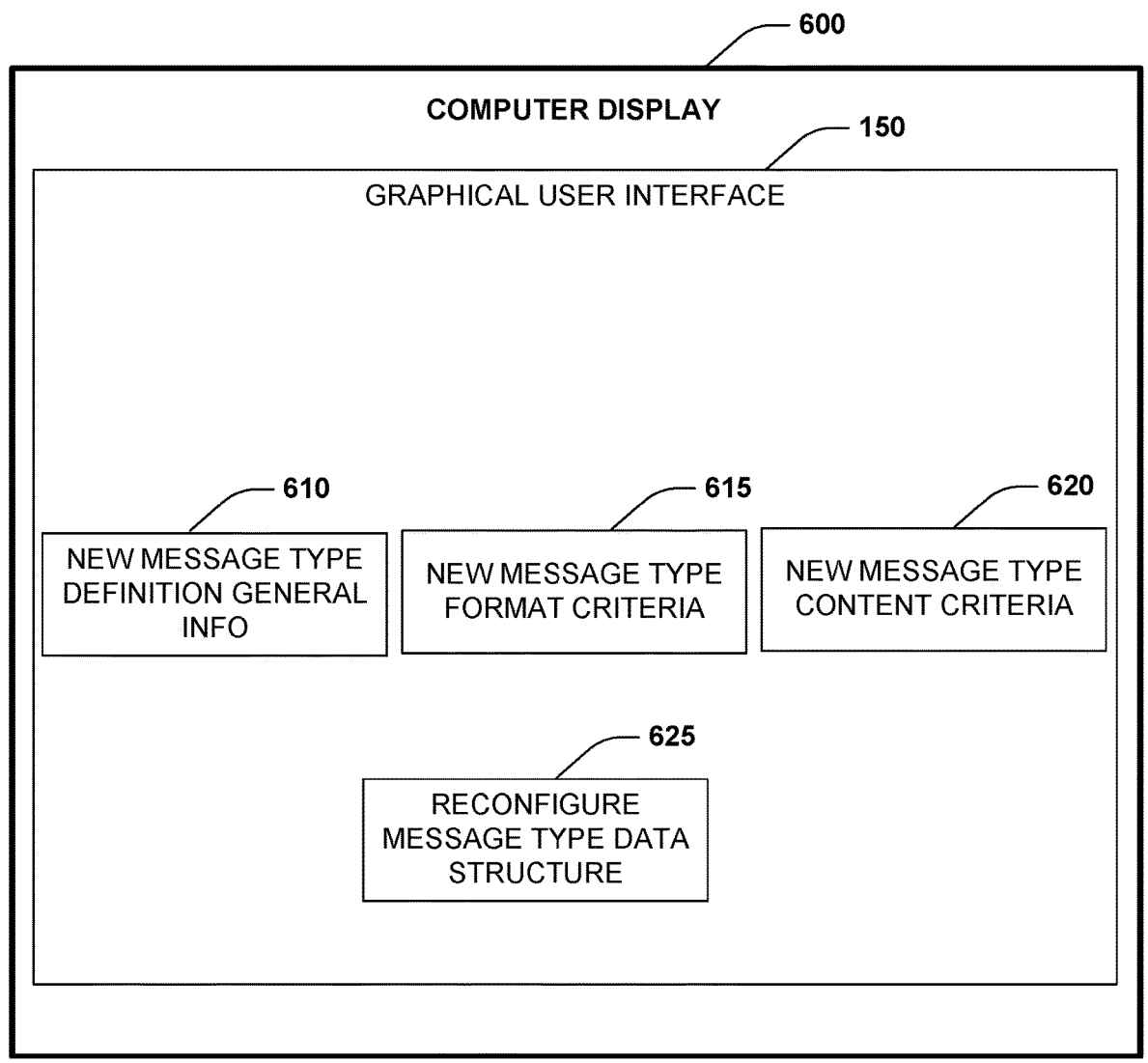
FIG. 6 illustrates an embodiment of a computer display and a graphical user interface.

One embodiment of controlling of the graphical user 150 interface on the display screen 600 is illustrated in FIG. 6. The display screen 600 renders, as part of the graphical user interface 150, a graphical object 610, a graphical object 615, a graphical object 620 and a graphical object 625. The graphical object 610 graphically represents the selectable input field based upon the first instruction 510. The graphical object 615 graphically represents the entry input field based upon the second instruction 515. The graphical object 620 graphically represents a third input field based upon a default setting. A graphical object 625 graphically represents the transmission element based upon the third instruction 520.

The graphical object 610 graphically representing the selectable input field may be configured to receive a selection of a first parameter from amongst a plurality of parameters, such as via a drop-down menu. The graphical object 615 graphically representing the entry input field may be configured to receive entry of a second parameter, such as a character entered via keystroke. The graphical object 620 graphically representing the third input field may be configured to receive confirmation/selection of a third parameter, such as via a checkbox or a radio button.

The graphical object 625 graphically representing the transmission element may be selectable, such as a button, and in response to being selected, the transmission element may cause the first parameter, the second parameter and the third parameter to be transmitted via a network connection to a computer device, such as the controller 105. In some examples, the selection of the transmission element may cause the generation of a (single) message comprising a combination of at least some of each of the first parameter, the second parameter and the third parameter, and the message may be transmitted to the computer device, while in other examples, the parameters may be transmitted separately.

Returning to FIG. 2, at 220, the parameters, including one or more of the first parameter, the second parameter, and/or the third parameter, may be received by the controller 105 via the input fields of the message type configuration interface. At 225, a message type definition corresponding to a message format of the electronic transaction message 110 is generated based upon the received parameters. One or more of the parameters are used to define elements of the electronic transaction message 110 that were previously determined to not be defined by the message type data structure 130.

For example, the first parameter is used to define the first element of the electronic transaction message 110 and the second parameter is used to define the second element of the electronic transaction message 110. In some embodiments, one or more of the parameters are used to define elements of the electronic transaction message 110 that were previously determined to be defined. For example, the third parameter is used to define a third element of the electronic transaction message 110.

In some examples, one or more portions of the generated message type definition are determined based upon global or default settings, which may be retrieved from a local (local to the controller 105) or remote (via a network connection) settings database. In some examples, one or more portions of the generated message type definition are determined based upon portions of existing message type definitions in the message type data structure 130.

For example, an existing message type definition may be identified as having a threshold level of similarity to portions of the message type definition being generated, or may be identified as being associated with electronic transaction messages determined to have a threshold level of similarity to the electronic transaction message 110. The existing message type definition may thus be selected for use in generating the message type definition, and one or more portions of the existing message type definition may be extracted and inserted into the message type definition being generated.

At 230, the message type data structure 130 is reconfigured to include the generated message type definition. In some examples, the message type definition is stored in the message type data structure 130 as a new definition for the message type, while in other examples, an existing message type definition in the message type data structure 130 is modified to include one or more additional (previously not included, or different) parameters based upon the message type definition. The message type definitions in the message type data structure 130 may be stored in one or more formats, such as an Extensible Markup Language (XML) format (in an XSD file), a JavaScript Object Notation (JSON) format, etc.

The reconfiguration of the message type data structure 130 enables the controller 105 to not only process the electronic transaction message 110, but also to mitigate a delay in processing subsequently received electronic transaction messages that share the same message type of the electronic transaction message 110. Using the method 200, professional coders are no longer needed to analyze the electronic transaction message 110 and manually write code to generate a definition for the electronic transaction message 110. Instead, the message type configuration interface acts as a centralized tool that is accessible at a centralized location usable to efficiently and conveniently generate the definition without undue delay. Electronic transaction messages associated with new message types can therefore be recognized and processed at a greater speed through implementation of the improved message type configuration interface. Thus, the system can reduce errors that occur when unrecognized messages are received and be able to process new message types.

In some examples, after the reconfiguration of the message type data structure 130, subsequent messages received that have the same message type are recognized and processed without error. For example, when a second electronic transaction message is received (by the controller 105), the second electronic transaction message is analyzed to determine its message type (e.g., a second message type). The message type data structure 130 is queried based upon the second message type, and a second message type definition corresponding to (e.g., matching) the second message type is retrieved from the message type data structure 130. The second electronic transaction message is parsed into message components based upon the second message type definition of the second message type.

The message components are analyzed to determine an electronic action associated with the second electronic transaction message based upon a first component of the message components. For example, the second electronic transaction message may be determined, based upon the first part, to correspond to an electronic action including a conversion of funds from a first currency to a second currency and a transfer of the funds from a first account to a second account.

An electronic message including an instruction to perform the electronic action is generated based upon a second component of the message components. The second component may be used to identify values associated with the performance of the electronic action. For example, the funds to be converted and transferred may be determined to be a first amount of funds, the first account may be determined to have a first account identifier, and the second account may be determined to have a second account identifier, based upon the second part.

In some examples, the generated electronic message is transmitted to a third remote device via a network connection. The third remote device may be an authorized computer that manages one or more accounts, and is able to transfer funds between accounts. In some examples, the generated electronic message may be provided to a (consuming) application via one or more application programming interfaces. The receiving application may perform operations to facilitate the electronic action, or to perform a supplementary action, such as monitoring, reporting (e.g., suspicious activity), or performing analytics.

While some of the examples of electronic transaction messages described herein pertain to payment instructions, the disclosed system can similarly process other electronic messages using the techniques described herein. For example, electronic messages associated with clearing and settlement instructions for payments, securities, forex and derivatives transactions may similarly be processed and defined.

In one embodiment, the computerized system 100 is a computing/data processing system including an application or collection of distributed applications for enterprise organizations. The computerized system 100 may be configured to operate with or be implemented as a cloud-based networking system, a software as a service (SaaS) architecture, or other type of networked computing solution. In one embodiment the system is a centralized server-side application that provides at least the functions disclosed herein and that is accessed by many users via computing devices/terminals communicating with the computerized system 100 (functioning as the server) over a computer network.

Figure 7:
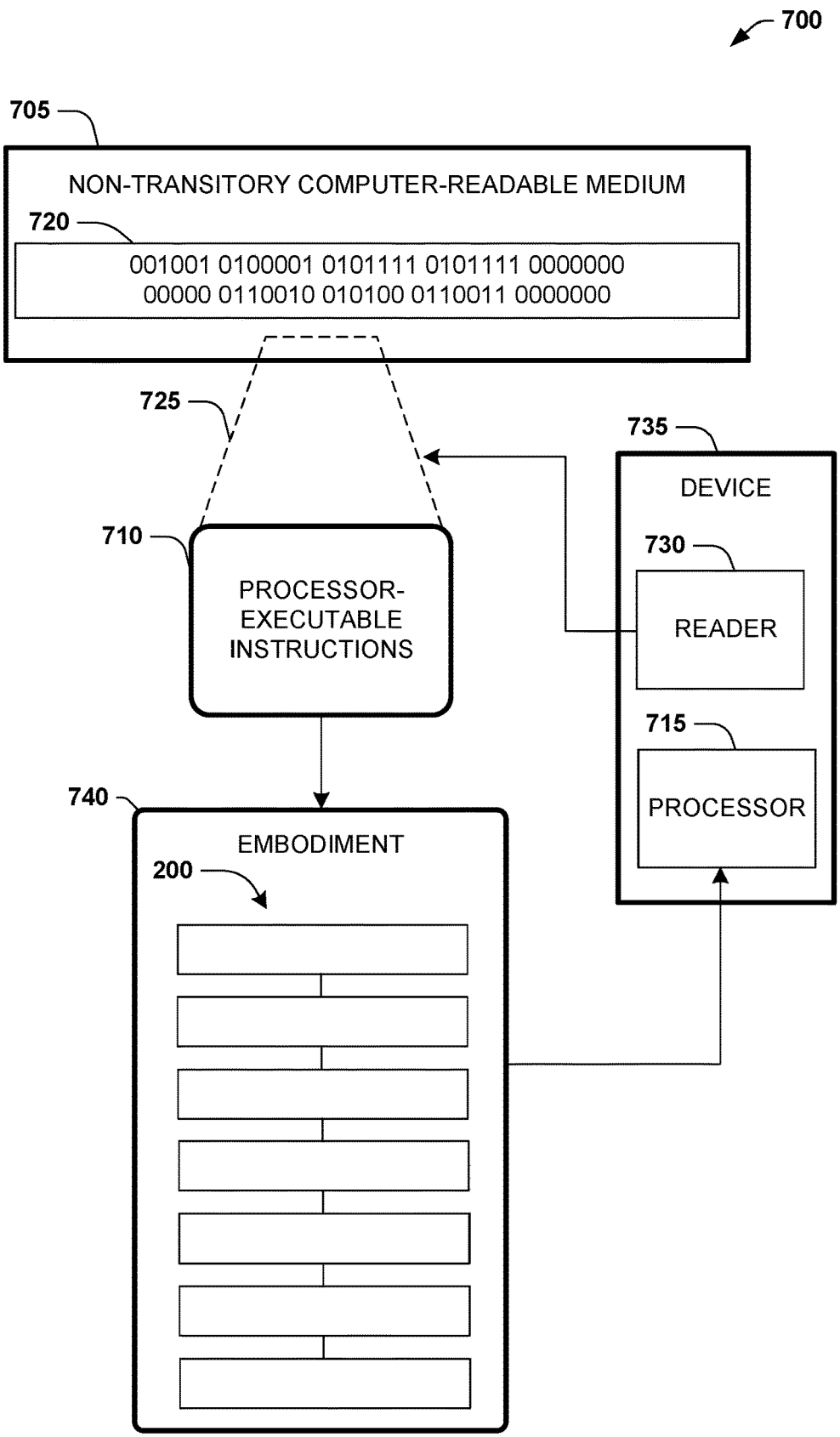
FIG. 7 illustrates an embodiment of a non-transitory computer-readable medium.

FIG. 7 is an illustration of a scenario 700 involving an example non-transitory computer-readable medium 705. In one embodiment, one or more of the components described herein are configured as program modules, such as the controller 105, stored in the non-transitory computer-readable medium 705. The program modules are configured with stored instructions, such as processor-executable instructions 710, that when executed by at least a processor, such as processor 715, cause the computing device to perform the corresponding function(s) as described herein. For example, functionality of the controller 105, stored in the non-transitory computer-readable medium 705, may be executed by the processor 715 as the processor-executable instructions 710 to perform an embodiment 740 of the method 200 of FIG. 2.

The non-transitory machine readable medium 705 includes the processor-executable instructions 710 that when executed by a processor 715 cause performance of at least some of the provisions herein. The non-transitory machine readable medium 705 includes a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory machine readable medium 705 stores computer-readable data 720 that, when subjected to reading 725 by a reader 730 of a device 735 (e.g., a read head of a hard disk drive, or a read operation invoked on a solid-state storage device), express the processor-executable instructions 710. In some embodiments, the processor-executable instructions 710, when executed cause performance of operations, such as at least some of the example method 200 of FIG. 2, for example. In some embodiments, the processor-executable instructions 710 are configured to cause implementation of a system, such as at least some of the example system 100 of FIG. 1, for example.

Figure 8:
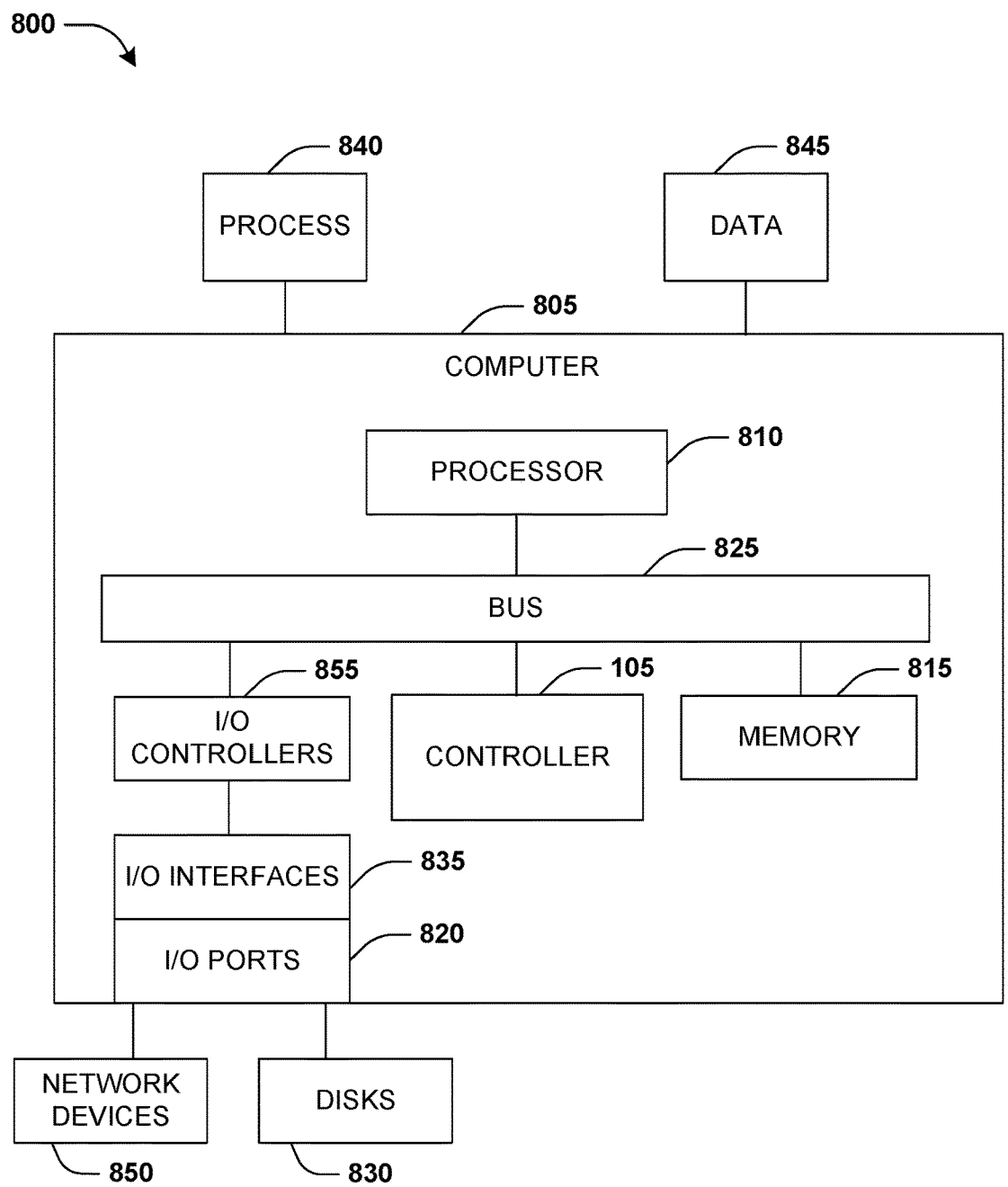
FIG. 8 illustrates an embodiment of a computing system configured with the example systems and/or methods disclosed.

FIG. 8 illustrates a scenario 800 of an example computing device that is configured and/or programmed with one or more of the example systems and methods described herein, and/or equivalents. The example computing device may be a computer 805 that includes a processor 810, a memory 815, and input/output ports 820 operably connected by a bus 825. In one example, the computer 805 may include logic of the controller 105 configured to facilitate the system 100 and/or the method 200 shown in FIGS. 1 and 2. In different examples, the logic of the controller 105 may be implemented in hardware, a non-transitory computer-readable medium 705 with stored instructions, firmware, and/or combinations thereof. While the logic of the controller 105 is illustrated as a hardware component attached to the bus 825, it is to be appreciated that in other embodiments, the logic of the controller 105 could be implemented in the processor 810, stored in memory 815, or stored in disk 830.

In one embodiment, logic of the controller 105 or the computer 805 is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an application specific integrated circuit (ASIC) programmed to implement rule based source sequencing for allocation. The means may also be implemented as stored computer executable instructions that are presented to computer 805 as data 845 that are temporarily stored in memory 815 and then executed by processor 810.

The logic of the controller 105 may also provide means (e.g., hardware, non-transitory computer-readable medium 705 that stores executable instructions, firmware) for performing rule based source sequencing for allocation.

Generally describing an example configuration of the computer 805, the processor 810 may be a variety of various processors including dual microprocessor and other multi-processor architectures. The memory 815 may include volatile memory and/or non-volatile memory. Non-volatile memory may include, for example, read-only memory (ROM), programmable read-only memory (PROM), and so on. Volatile memory may include, for example, random access memory (RAM), static random-access memory (SRAM), dynamic random access memory (DRAM), and so on.

The disks 830 may be operably connected to the computer 805 via, for example, an input/output (I/O) interface (e.g., card, device) 835 and an input/output port 820. The disks 830 may be, for example, a magnetic disk drive, a solid state disk drive, a floppy disk drive, a tape drive, a Zip drive, a flash memory card, a memory stick, and so on. Furthermore, the disks 830 may be a CD-ROM drive, a CD-R drive, a CD-RW drive, a DVD ROM, and so on. The memory 815 can store a process 840 and/or a data 845, for example. The disk 830 and/or the memory 815 can store an operating system that controls and allocates resources of the computer 805.

The computer 805 may interact with input/output (I/O) devices via the I/O interfaces 835 and the input/output ports 820. Input/output devices may be, for example, a keyboard, a microphone, a pointing and selection device, cameras, video cards, displays, the disks 830, the network devices 850, and so on. The input/output ports 820 may include, for example, serial ports, parallel ports, and USB ports. I/O controllers 855 may connect the I/O interfaces 835 to the bus 825.

The computer 805 can operate in a network environment and thus may be connected to the network devices 850 via the I/O interfaces 835, and/or the I/O ports 820. Through the network devices 850, the computer 805 may interact with a network. Through the network, the computer 805 may be logically connected to remote computers. Networks with which the computer 805 may interact include, but are not limited to, a local area network (LAN), a new area network (WAN), and other networks.

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A non-transitory computer-readable medium storing computer-executable instructions that when executed by at least a processor of a computer cause the computer to:
   in response to receiving, by at least the computer, an electronic transaction message from a remote device, analyze, by at least the processor, the electronic transaction message to determine a message type of the electronic transaction message;
   query, by at least the processor, a message type data structure to
      compare a plurality of elements in the electronic transaction message to definitions in the message type data structure, and
      determine that the message type is not defined in the message type data structure because at least one element of the plurality of elements is not defined in the definitions;
   in response to determining that the message type is not defined in the message type data structure, generate, by at least the processor, a message type configuration interface comprising an input field for defining the at least one element in the message type without requiring the manual writing of new code defining the message type;
   receive, by at least the processor, a parameter for the at least one element through the input field of the message type configuration interface;
   generate, by at least the processor, a message type definition based upon the parameter; and
   reconfigure, by at least the processor, the message type data structure to (i) include the message type definition generated and (ii) associate the message type definition with the message type.

2. The non-transitory computer-readable medium of claim 1, further comprising instructions that when executed by at least the processor cause the computer to:
   receive a second electronic transaction message from a second remote device;
   analyze the second electronic transaction message to determine a second message type of the second electronic transaction message;
   query and retrieve a second message type definition corresponding to the second message type from the message type data structure, wherein the second message type definition specifies a message format of the second message type; and
   parse the second electronic transaction message into message components based upon the second message type definition of the second message type.

3. The non-transitory computer-readable medium of claim 2, further comprising instructions that when executed by at least the processor cause the computer to:
   analyze the message components to determine an electronic action associated with the second electronic transaction message based upon a first component of the message components;
   generate an electronic message comprising an instruction to perform the electronic action based upon a second component of the message components; and
   transmit the electronic message to a third remote device.

4. The non-transitory computer-readable medium of claim 1, wherein the computer-executable instructions to analyze the electronic transaction message to determine the message type of the electronic transaction message further include computer-executable instructions that when executed by the processor cause the computer to:
   identify the plurality of elements in the electronic transaction message,
   wherein the plurality of elements is indicative of a message format of the electronic transaction message; and
   wherein each definition in the message type data structure specifies at least one message format of at least one message type.

5. The non-transitory computer-readable medium of claim 1, wherein:
   the message type configuration interface is a centralized interface configured to generate the message type definition for the message type without requiring the manual writing of new code defining the message type; and
   wherein the at least one element is defined by the parameter in the message type definition.

6. The non-transitory computer-readable medium of claim 1, further comprising instructions that when executed by at least the processor cause the computer to:
   control a graphical user interface of a computer device to display the message type configuration interface, wherein the input field is one of one or more input fields of the message type configuration interface that are configured to receive at least one of (i) a selection of an option associated with a first parameter or (ii) an entry of a value associated with a second parameter,
   wherein the message type configuration interface is a centralized interface configured to generate the message type definition for the message type without requiring the manual writing of new code defining the message type.

7. The non-transitory computer-readable medium of claim 1, wherein the computer-executable instructions to reconfigure the message type data structure based upon the message type definition further include computer-executable instructions that when executed by the processor cause the computer to:
   modify an existing message type definition in the message type data structure to include one or more additional parameters based upon the message type definition; or
   store the message type definition in the message type data structure as a new definition for the message type.

8. A computing system, comprising:
   a processor connected to memory; and
   a reconfiguration module stored on a non-transitory computer readable medium and configured with instructions that when executed by the processor cause the processor to:
   in response to receiving, by at least the computer, an electronic transaction message from a remote device, analyze the electronic transaction message to determine a message type of the electronic transaction message;
   query a message type data structure to compare a plurality of elements in the electronic transaction message to definitions in the message type data structure, and determine that the message type is not defined in the message type data structure because at least one element of the plurality of elements is not defined in the definitions;

in response to determining that the message type is not defined in the message type data structure, generate a message type configuration interface comprising an input field for defining the at least one element in the message type without requiring the manual writing of new code defining the message type;

receive a parameter for the at least one element though the input field of the message type configuration interface;

generate a message type definition based upon the parameter; and reconfigure the message type data structure to (i) include the message type definition generated and (ii) associate the message type definition with the message type.

9. The computing system of claim 8, wherein the reconfiguration module is further configured with instructions that when executed by the processor cause the processor to:

receive a second electronic transaction message from a second remote device;

analyze the second electronic transaction message to determine a second message type of the second electronic transaction message;

query and retrieve a second message type definition corresponding to the second message type from the message type data structure; and parse the second electronic transaction message into message components based upon the second message type definition of the second message type.

10. The computing system of claim 9, wherein the reconfiguration module is further configured with instructions that when executed by the processor cause the processor to:

analyze the message components to determine an electronic action associated with the second electronic transaction message based upon a first component of the message components;

generate an electronic message comprising an instruction to perform the electronic action based upon a second component of the message components; and transmit the electronic message to a third remote device.

11. The computing system of claim 8, wherein the instructions to analyze the electronic transaction message to determine the message type of the electronic transaction message further include instructions that when executed by the processor cause the processor to:

identify the plurality of elements in the electronic transaction message.

12. The computing system of claim 8, wherein the at least one element is defined by the parameter in the message type definition.

13. The computing system of claim 8, wherein the reconfiguration module is further configured with instructions that when executed by the processor cause the processor to:

control a graphical user interface of a computer device to display the message type configuration interface, wherein the input field is one of one or more input fields of the message type configuration interface that are configured to receive at least one of (i) a selection of an option associated with a first parameter or (ii) an entry of a value associated with a second parameter.

14. The computing system of claim 8, wherein the instructions to reconfigure the message type data structure based upon the message type definition further include instructions that when executed by the processor cause the processor to:

modify an existing message type definition in the message type data structure to include one or more additional parameters based upon the message type definition; or store the message type definition in the message type data structure as a new definition for the message type.

15. A computer-implemented method performed by a computing device comprising a processor, the computer-implemented method comprising:

in response to receiving, by at least the computer, an electronic transaction message from a remote device, analyzing, by at least the processor, the electronic transaction message to determine a message type of the electronic transaction message;

querying, by at least the processor, a message type data structure to compare a plurality of elements in the electronic transaction message to definitions in the message type data structure, and determine that the message type is not defined in the message type data structure because at least one element of the plurality of elements is not defined in the definitions;

in response to determining that the message type is not defined in the message type data structure, generating, by at least the processor, a message type configuration interface comprising an input field for defining the at least one element in the message type without requiring the manual writing of new code defining the message type;

receiving, by at least the processor, a parameter for the at least one element through the input field of the message type configuration interface;

generating, by at least the processor, a message type definition based upon the parameter; and reconfiguring, by at least the processor, the message type data structure to (i) include the message type definition generated and (ii) associate the message type definition with the message type.

16. The computer-implemented method of claim 15, further comprising:

receiving a second electronic transaction message from a second remote device;

analyzing the second electronic transaction message to determine a second message type of the second electronic transaction message;

querying and retrieve a second message type definition corresponding to the second message type from the message type data structure; and parsing the second electronic transaction message into message components based upon the second message type definition of the second message type.

17. The computer-implemented method of claim 16, further comprising:

analyzing the message components to determine an electronic action associated with the second electronic transaction message based upon a first component of the message components;

generating an electronic message comprising an instruction to perform the electronic action based upon a second component of the message components; and transmitting the electronic message to a third remote device.

18. The computer-implemented method of claim 15, wherein the analyzing the electronic transaction message to determine the message type of the electronic transaction message comprises:
   identifying the plurality of elements in the electronic transaction message.

19. The computer-implemented method of claim 15, wherein:
   the message type configuration interface is generated to include an input field configured to define the at least one element based upon the determination that at least one element of the plurality of elements is not defined in the definitions, and
   wherein the at least one element is defined by the parameter in the message type definition.

20. The computer-implemented method of claim 15, further comprising:
   controlling a graphical user interface of a computer device to display the message type configuration interface, wherein the input field is one of one or more input fields of the message type configuration interface that are configured to receive at least one of (i) a selection of an option associated with a first parameter or (ii) an entry of a value associated with a second parameter.

* * * * *